(12) United States Patent
Wang et al.

(10) Patent No.: US 10,962,836 B2
(45) Date of Patent: Mar. 30, 2021

(54) DISPLAY DEVICE

(71) Applicant: Au Optronics Corporation, Hsinchu (TW)

(72) Inventors: Hung-I Wang, Hsinchu (TW); Ti-Kuei Yu, Hsinchu (TW); Chia-Jung Wu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/594,067

(22) Filed: Oct. 6, 2019

(65) Prior Publication Data
US 2020/0326596 A1 Oct. 15, 2020

(30) Foreign Application Priority Data

Apr. 9, 2019 (TW) .................................. 108112391

(51) Int. Cl.
*G02F 1/13357* (2006.01)
*G02F 1/1335* (2006.01)

(52) U.S. Cl.
CPC .. *G02F 1/133617* (2013.01); *G02F 1/133528* (2013.01); *G02F 2202/28* (2013.01)

(58) Field of Classification Search
CPC ......... G02F 1/133602; G02F 1/133617; G02F 2001/133342; G02F 2001/01791; G02F 2001/133614; G02F 2201/44; G02F 1/1347–2001/13478; H01L 51/502;
(Continued)

(56) References Cited

U.S. PATENT DOCUMENTS

| 10,048,530 B1 | 8/2018 | Kim et al. |
| 10,203,439 B2 | 2/2019 | Li |
| 2016/0116801 A1 | 4/2016 | Fan et al. |

(Continued)

FOREIGN PATENT DOCUMENTS

| CN | 105700236 | 6/2016 |
| CN | 106597747 | 4/2017 |

(Continued)

OTHER PUBLICATIONS

Qi Hong et al., "High-efficiency quantum dot remote phosphor film ", Applied Optics vol. 54, No. 15, May 11, 2015, pp. 4617-4622.
(Continued)

*Primary Examiner* — Edmond C Lau
*Assistant Examiner* — Mariam Qureshi
(74) *Attorney, Agent, or Firm* — JCIPRNET (57) ABSTRACT

A display device includes a first display panel, a second display panel, a quantum dot layer and a backlight module. The first display panel includes a first substrate, a second substrate, and a first display medium layer disposed between the second substrate and the first substrate. The second display panel includes a third substrate, a fourth substrate and a second display medium layer disposed between the third substrate and the fourth substrate. The quantum dot layer is disposed between the second substrate and the fourth substrate, and the quantum dot layer has multiple first quantum dot particles, multiple second quantum dot particles and multiple diffusing particles dispersed therein. The backlight module is located at a side of the second display panel.

19 Claims, 6 Drawing Sheets

(58) Field of Classification Search
CPC ........ H01L 31/035218; H01L 51/5012; H05B 33/00; G02B 30/26; G02B 30/34; H04N 13/00

See application file for complete search history.

(56) References Cited

U.S. PATENT DOCUMENTS

| | | | | |
|---|---|---|---|---|
| 2016/0320540 | A1* | 11/2016 | Hsiao | G02B 6/0085 |
| 2018/0088261 | A1* | 3/2018 | Song | G02F 1/133514 |
| 2018/0156953 | A1* | 6/2018 | Li | G02F 1/133615 |
| 2019/0257993 | A1* | 8/2019 | Kim | G02B 5/32 |
| 2019/0331955 | A1* | 10/2019 | Lee | G02B 6/00 |
| 2020/0117032 | A1* | 4/2020 | Chan | G02F 1/1347 |

FOREIGN PATENT DOCUMENTS

| | | |
|---|---|---|
| CN | 107643641 | 1/2018 |
| CN | 109471300 | 3/2019 |
| TW | 201911565 | 3/2019 |

OTHER PUBLICATIONS

Electrical Engineering Stack Exchange, "How to generate Red light from a Blue-Dominated Spectrum", Oct. 1, 2019, Available at: https://electronics.stackexchange.com/questions/124095/how-to-generate-red-light-from-a-blue-dominated-spectrum.

"Office Action of India Counterpart Application", dated Dec. 23, 2020, p. 1-p. 7.

* cited by examiner

DISPLAY DEVICE

CROSS-REFERENCE TO RELATED APPLICATION

This application claims the priority benefit of Taiwan application serial no. 108112391, filed on Apr. 9, 2019. The entirety of the above-mentioned patent application is hereby incorporated by reference herein and made a part of this specification.

BACKGROUND

Technical Field

The disclosure relates to an electronic device, and more particularly to a display device.

Description of Related Art

Along with increasing development of the electronic industry, flat-panel display devices have been developed and progressed. At present, technologies for liquid crystal display devices are most mature and popular. Liquid crystal display devices have the advantages of low radiation, light weight, small size and the like, and have been extensively applied to various electronic products today. For meeting different requirements of different products on display effects, part of liquid crystal display device products are developed from an original single-layer liquid crystal panel structure to a double-layer liquid crystal panel structure. Since two liquid crystal panels of such a display device have regularly arranged pixel arrays, moiré patterns are easily formed by an interference phenomenon to affect the quality of the display device.

SUMMARY

The disclosure provides a display device. A quantum dot layer is disposed between two display medium layers of the display device, to alleviate a moiré pattern phenomenon and improve the display quality.

A display device of the disclosure includes a first display panel and a second display panel. The first display panel includes a first substrate, a second substrate and a first display medium layer disposed between the second substrate and the first substrate. The second display panel includes a third substrate, a fourth substrate and a second display medium layer disposed between the third substrate and the fourth substrate. The first display panel and the second display panel are mutually stacked in a manner that the second substrate and the fourth substrate are located between the first substrate and the third substrate. A quantum dot layer is disposed between the second substrate and the fourth substrate, and the quantum dot layer has multiple first quantum dot particles, multiple second quantum dot particles and multiple diffusing particles dispersed therein. A backlight module is disposed at a side of the second display panel.

Another display device of the disclosure includes a first substrate, a second substrate, a third substrate and a fourth substrate. The second substrate is opposite to the first substrate, and is disposed between the first substrate and the third substrate. A first display medium layer is disposed between the first substrate and the second substrate. A second display medium layer is disposed between the third substrate and the fourth substrate. A quantum dot layer is disposed between the first display medium layer and the second display medium layer, and the quantum dot layer includes multiple first quantum dot pixels, multiple second quantum dot pixels and multiple third quantum dot pixels. Each first quantum dot pixel has multiple first quantum dot particles, each second quantum dot pixel has multiple second quantum dot particles, and each of the first quantum dot pixel, the second quantum dot pixel and the second quantum dot pixel has multiple diffusing particles. A backlight module is disposed at a side of the third substrate.

Based on the above, the display device provided in the disclosure includes the two display medium layers and the quantum dot layer located between the two display medium layers, and each of the two display medium layers is driven and controlled by a pixel array layer. The quantum dot layer disposed between the two display medium layers has a light diffusing function, so that an interference effect caused by stacking of the two pixel array layers with one above the other may be reduced, the visibility of a moiré pattern may be alleviated, and the display quality of the display device is improved.

In order to make the aforementioned and other objectives and advantages of the disclosure comprehensible, embodiments accompanied with figures are described in detail below.

DESCRIPTION OF THE EMBODIMENTS

Figure 1:
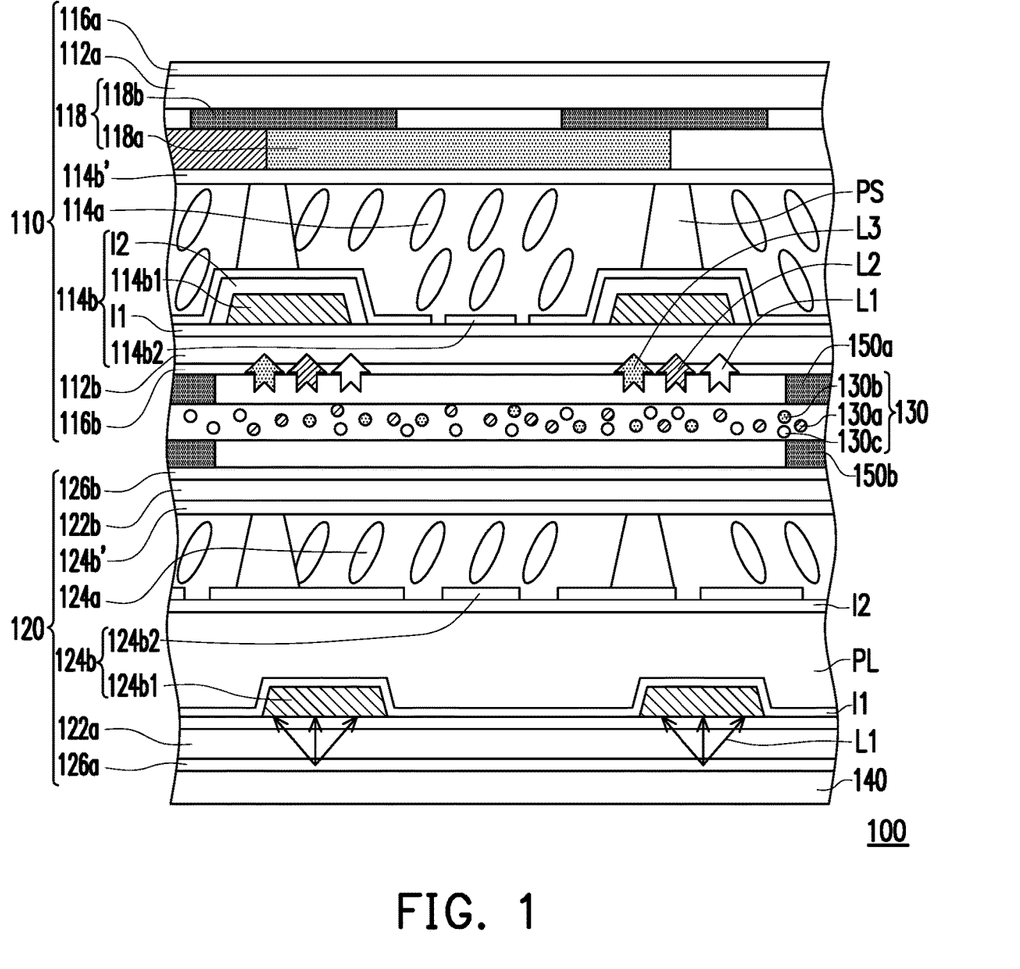
FIG. 1 is a schematic diagram of a display device according to an embodiment of the disclosure.

FIG. 1 is a schematic diagram of a display device according to an embodiment of the disclosure. In the embodiment shown in FIG. 1, the display device 100 includes a first display panel 110, a second display panel 120, a quantum dot layer 130 and a backlight module 140. The quantum dot layer 130 is disposed between the first display panel 110 and the second display panel 120, and the backlight module 140 is located at a side of the second display panel 120 to emit initial light L1 to the second display panel 120, the quantum dot layer 130 and the first display panel 110.

The initial light L1 emitted by the backlight module 140 may be controlled and regulated by the second display panel 120 at first, then projected to the first display panel 110 through the quantum dot layer 130 and emitted by the first display panel 110 to display a picture. Therefore, the initial light L1 may be subjected to multiple control and regulation, and by such a design, high-contrast picture displaying, three-dimensional picture displaying or multi-field-of-view picture displaying, etc. may be implemented. For example, in part of embodiments, a switching function of the second display panel 120 may be used for regulating an intensity of the light entering the first display panel 110, and the first display panel 110 may be used for presenting picture information. In such a matching manner, a high-contrast image display effect may be achieved.

The first display panel 110 mainly includes a first substrate 112a, a second substrate 112b and a first display medium layer 114a disposed between the first substrate 112a and the second substrate 112b. The first substrate 112a and the second substrate 112b may be light transmission substrates, and materials thereof include glass, plastics or other composite materials. The first substrate 112a may be spaced from the second substrate 112b by a fixed spacing through a spacer PS, to maintain a thickness of the first display medium layer 114a. A material for the first display medium layer 114a includes a liquid crystal or another material that may be driven by an electric field to achieve a light modulation characteristic. The first display panel 110 further includes a first pixel array layer 114b. The first pixel array layer 114b is disposed between the second substrate 112b and the first display medium layer 114a. The first pixel array layer 114b is used for providing a driving electric field for driving the first display medium layer 114a. In the present embodiment, the first display panel 110 may further include a counter electrode 114b' opposite to the first pixel array layer 114b. The first pixel array layer 114b is matched with the counter electrode 114b' to provide the driving electric field.

Although not all components of the first pixel array layer 114b are shown in FIG. 1, the first pixel array layer 114 may specifically include multiple signal lines 114b1 (for example, scan lines and data lines), multiple active elements (not shown), multiple first pixel electrodes 114b2 and insulating layers I1 and I2 for spacing different conductive components, etc. Each first pixel electrode 114b2 may be connected with the corresponding active element (not shown) to form a pixel (or called a pixel structure). A specific layout manner for the first pixel array layer 114b and a disposing and connecting relationship between each component may be implemented with reference to a pixel array structure of a liquid crystal display panel that those of ordinary skill are familiar with, and the descriptions thereof are omitted herein.

The first display panel 110 further includes a first polarization layer 116a and a second polarization layer 116b. The first polarization layer 116a and the second polarization layer 116b may be disposed on an outer side of the first substrate 112a and an outer side of the second substrate 112b respectively. That is, all the first substrate 112a, the second substrate 112b and the first display medium layer 114a are located between the first polarization layer 116a and the second polarization layer 116b. In addition, in the present embodiment, the second polarization layer 116b is disposed at the side, close to the second display panel 120, of the first display panel 110.

The first display panel 110 further includes a color filter layer 118, and the color filter layer 118 may be, but not limited to, disposed between the first substrate 112a and the first display medium layer 114a. The color filter layer 118 may include multiple color filter patterns 118a and multiple shading patterns 118b. Different color filter patterns 118a may be in different colors, to achieve a color picture display effect. Positions where the shading patterns 118b are disposed may cover each signal line 114b1 and correspond to peripheries of each pixel (or pixel structure) of the first pixel array layer 114b, and each color filter pattern 118a is overlapped at the first pixel electrode 114b2 of each pixel (or pixel structure) of the first pixel array layer 114b. A first pixel disposing density of the first pixel array layer 114b may be, but not limited to, the same as a disposing density of the color filter patterns 118a in the color filter layer 118. In part of embodiments, a single color filter pattern 118a in the color filter layer 118 may correspond to the pixels in the same column in the first pixel array layer 114b.

The second display panel 120 mainly includes a third substrate 122a, a fourth substrate 122b and a second display medium layer 124a disposed between the third substrate 122a and the fourth substrate 122b. A material of the second display medium layer 124a, like the material of the first display medium layer 114a, includes a liquid crystal or another material that may be driven by an electric field to achieve a light modulation characteristic. In addition, the second display panel 120 further includes a second pixel array layer 124b, a counter electrode 124b', a third polarization layer 126a and a fourth polarization layer 126b. Functions and disposing relationship of the third substrate 122a, the fourth substrate 122b, the second display medium layer 124a, the second pixel array layer 124b, the counter electrode 124b', the third polarization layer 126a and the fourth polarization layer 126b are substantially similar to those of the first substrate 112a, the second substrate 112b, the first display medium layer 114a, the first pixel array layer 114b, the counter electrode 114b', the first polarization layer 116a and the second polarization layer 116b in the first display panel 110, and thus the relative relationship of these components may refer to the aforementioned contents and the descriptions thereof are omitted. However, the second display panel 120 includes no color filter layer.

Specifically, the first pixel disposing density of the first pixel array layer 114b of the first display panel 110 may be different from a second pixel disposing density of the second pixel array layer 124b of the second display panel 120. The pixel disposing density of each display panel may be determined by the number of the first pixel electrodes (114b2 or 124b2) in a selected area. In part of embodiments, the first pixel disposing density of the first display panel 110 may be greater than the second pixel disposing density of the second display panel 120. Therefore, a single pixel of the second display panel 120 may correspond to multiple pixels of the first display panel 110. However, in other alternative embodiments, the first display panel 110 and the second display panel 120 may have the same pixel disposing density.

In addition, in the present embodiment, the second pixel array layer 124b further includes a planar layer PL, besides multiple signal lines 124b1 (for example, scan lines and data lines), multiple active elements (not shown), multiple second pixel electrodes 124b2 and insulating layers I3 and I4 for spacing different conductive components. The planar layer PL is thicker than the insulating layers I3 and I4 and thus may reduce a height difference caused by the components below to form the second pixel electrodes 124b2 on a relatively planar surface. In part of embodiments, a material of the planar layer PL includes, but not limited to, a white photoresist material and an organic insulating material.

The third polarization layer 126a and the fourth polarization layer 126b may be disposed on outer sides of the third substrate 122a and the fourth substrate 122b respectively. That is, all the third substrate 122a, the fourth substrate 122b and the second display medium layer 124a are located between the third polarization layer 126a and the fourth polarization layer 126b. In addition, in the present embodiment, the fourth polarization layer 126b is disposed at the side, close to the first display panel 110, of the second display panel 120, and the second polarization layer 116b is disposed at the side, close to the second display panel 120, of the first display panel 110.

The quantum dot layer 130 is disposed between the second substrate 112b and the fourth substrate 122b, and may be located between the second polarization layer 116b and the fourth polarization layer 126b. The quantum dot layer 130 has multiple first quantum dot particles 130a, multiple second quantum dot particles 130b and diffusing particles 130c dispersed therein. The initial light L1, when passing through the quantum dot layer 130, may be subjected to reflection, refraction, diffusion and the like of the multiple first quantum dot particles 130a, the multiple second quantum dot particles 130b and the diffusing particles 130c, and then enters the first display panel 110. In such a manner, a moiré pattern effect caused by an internal structure (for example, the signal lines 114b1) of the first display panel 110 and an internal structure (for example, the signal lines 124b1) of the second display panel 120 may be inhibited or faded to facilitate improvement in the display quality of the display device 100.

A material of the diffusing particle 130c includes silicon oxide ($SiO_2$), titanium oxide ($TiO_2$), calcium carbonate ($CaCO_3$), barium sulfate ($BaSO_4$) and the like, and a particle size of the diffusing particle 130c is about 0.1 μm to 20 μm. In addition, the first quantum dot particle 130a and the second quantum dot particle 130b are nanocrystalline semiconductor materials or quantum dot materials, and materials thereof include, but not limited to, cadmium selenide (CdSe). In part of embodiments, the first quantum dot particle 130a and the second quantum dot particle 130b may be perovskite quantum dots, and include $ABX_3$, where A denotes Cesium (Cs), methylammonium (MA) or formamidinium (FA), B denotes a metal cation, for example, plumbum (Pb) or stannum (Sn), and X denotes a halogen anion, for example, chlorine (Cl), bromine (Br) and iodine (I). The quantum dot material may be optically excited to generate an electromagnetic wave, and a wavelength of the electromagnetic wave generated by the quantum dot material that is excited is related to a particle size thereof. In the present embodiment, the first quantum dot particle 130a and the second quantum dot particle 130b are, for example, different quantum dot particles that are different in, for example, at least one of size, material and lattice parameters.

In the present embodiment, the first quantum dot particles 130a, the second quantum dot particles 130b and the diffusing particles 130c are substantially uniformly distributed in the quantum dot layer 130. A first part of the initial light L1, after passing through the first quantum dot particles 130a, for example, may be converted into first converted light L2 with a first wavelength range, and a second part of the initial light L1, after passing through the second quantum dot particles 130b, for example, may be converted into second converted light L3 with a second wavelength range, the first wavelength range being different from the second wavelength range. In addition, the initial light L1 emitted by the backlight module 140 may have a third wavelength range, and the third wavelength range is different from the first wavelength range and also different from the second wavelength range. A third part of the initial light L1, after passing through the diffusing particles 130c, for example, may still have the third wavelength range. Therefore, after the initial light L1 passes through the quantum dot layer 130, the light with at least three different wavelength ranges may be provided for incidence to the first display panel 110.

In part of embodiments, the backlight module 140 may be a luminous module that emits blue light, and the first wavelength range, the second wavelength range and the third wavelength range may be a red light range, a green light range and a blue light range respectively. In such a manner, since part of the initial light L1 may not be converted, after the initial light L1 passes through the quantum dot layer 130, white light formed by the initial light L1, the first converted light L2 and the second converted light L3 may be provided for incidence to the first display panel 110. In other words, the backlight module 140 may not need to be a luminous module that emits white light.

The quantum dot layer 130 may be a preformed thin film. Therefore, the display device 100 may further include a first adhesive layer 150a and a second adhesive layer 150b. The quantum dot layer 130 is adhered to the first display panel 110 through the first adhesive layer 150a, and is adhered to the second display panel 120 through the second adhesive layer 150b. The first adhesive layer 150a and the second adhesive layer 150b may include a double-sided adhesive tape, an optical adhesive or another adhesive material capable of fixing the quantum dot layer 130 between the first display panel 110 and the second display panel 120 without affecting the display effect of the display device 100.

When the double-sided adhesive tape is taken as the first adhesive layer 150a and the second adhesive layer 150b, the first adhesive layer 150a and the second adhesive layer 150b may be disposed around the quantum dot layer 130, and air gaps are formed between the first display panel 110 and the quantum dot layer 130 and between the second display panel 120 and the quantum dot layer 130 respectively. However, the display device is not limited thereto. In part of alternative embodiments, the air gaps may be filled with a filler. When the optical adhesive is taken as the first adhesive layer 150a and the second adhesive layer 150b, the whole surface of the quantum dot layer 130 may be coated with the first adhesive layer 150a and the second adhesive layer 150b such that the optical adhesive is disposed between the first display panel 110 and the quantum dot layer 130 and between the second display panel 120 and the quantum dot layer 130.

In the present embodiment, the second display panel 120 is located between the first display panel 110 and the backlight module 140, and the first display panel 110 and the second display panel 120 are mutually stacked in a manner that the second substrate 112b and the fourth substrate 122b are located between the first substrate 112a and the third substrate 122a. Therefore, the quantum dot layer 130 is located between the second substrate 112b and the fourth substrate 122b, both the first display panel 110 and the second display panel 120 are located between the first polarization layer 116a and the third polarization layer 126a, the second polarization layer 116b is disposed between the second substrate 112b and the quantum dot layer 130, and the fourth polarization layer 126b is disposed between the fourth substrate 122b and the quantum dot layer 130. Generally speaking, for achieving high signal transmission quality, the multiple signal lines 114b1 of the first display panel 110 and the multiple signal lines 124b1 of the second display panel 120 may be made from a metal or a metal alloy. That is, the signal line 124b1 and the signal line 114b1 are linear shading components. Since the first display panel 110 and the second display panel 120 are stacked with one above the other, disposing the signal lines 124b1 and the signal lines 114b1 may easily cause a moiré pattern phenomenon to bring bad influence to the display quality, for example, forming moiré patterns. However, the quantum dot layer 130 of the present embodiment may diffuse and convert the light from the second display panel 120, which is favorable for alleviating the moiré pattern effect and improving the display quality of the display device 100.

Figure 2:
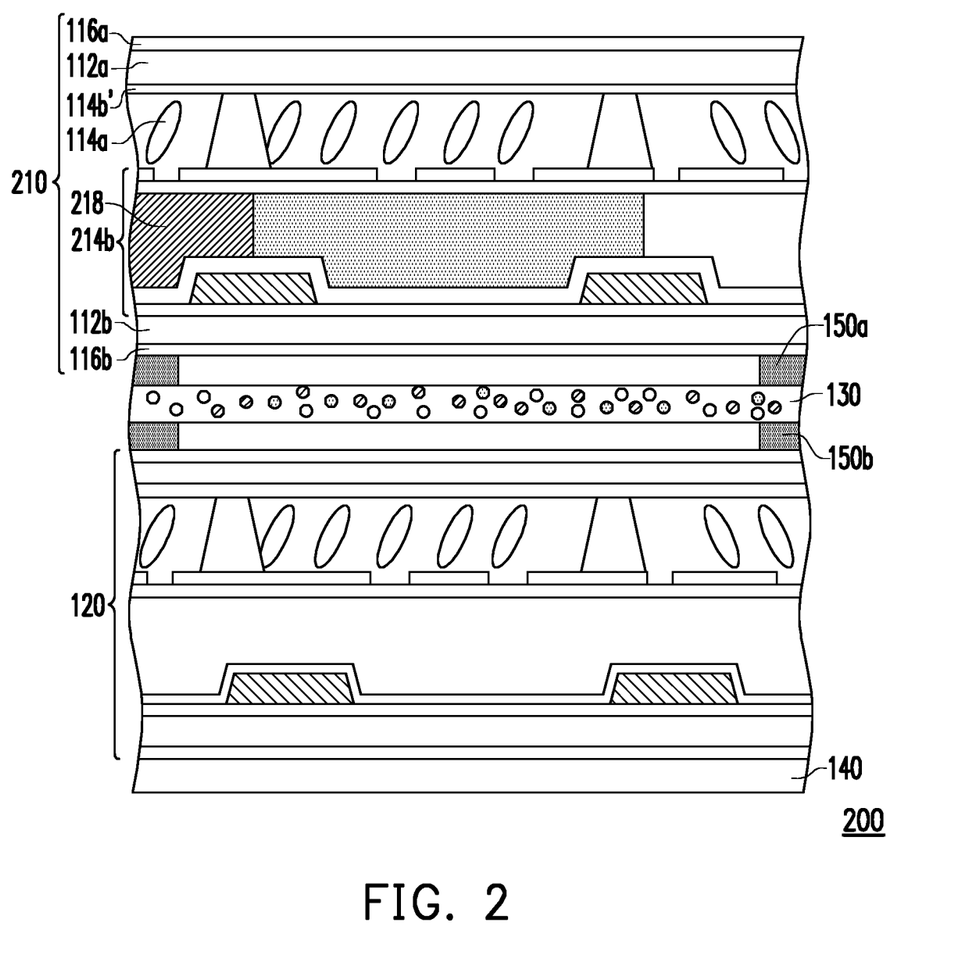
FIG. 2 is a schematic diagram of a display device according to an embodiment of the disclosure.

FIG. 2 is a schematic diagram of a display device according to another embodiment of the disclosure. Referring to FIG. 2, the display device 200 is substantially similar to the display device 100. Therefore, the same and similar element signs in the two embodiments represent the same and similar components, and disposing manners, structures, characteristics, materials and the like of these same and similar components may refer to related descriptions about the display device 100. Specifically, the display device 200 includes a first display panel 210, a second display panel 120, a quantum dot layer 130, a backlight module 140, a first adhesive layer 150a and a second adhesive layer 150b. However, the first display panel 210 of the present embodiment has a structural design different from that of the first display panel 110. Specifically, the first display panel 210 includes a first substrate 112a, a second substrate 112b, a first display medium layer 114a, a first pixel array layer 214b, a counter electrode 114b', a first polarization layer 116a, a second polarization layer 116b and a color filter layer 218. The first substrate 112a, the second substrate 112b, the first display medium layer 114a, the counter electrode 114b', the first polarization layer 116a and the second polarization layer 116b are substantially the same as the corresponding components in the display device 100. In the present embodiment, the color filter layer 218 may be integrated into the first pixel array layer 214b, and thus the color filter layer 218 is disposed between the second substrate 112b and the first display medium layer 114a. For FIG. 2, the color filter layer 218 may be disposed between a film layer where signal lines 114b1 are located and a film layer where first pixel electrodes 114b2 are located, and the color filter layer 218 may be thick enough to provide a function like a planar layer. However, the display device is not limited thereto.

Figure 3:
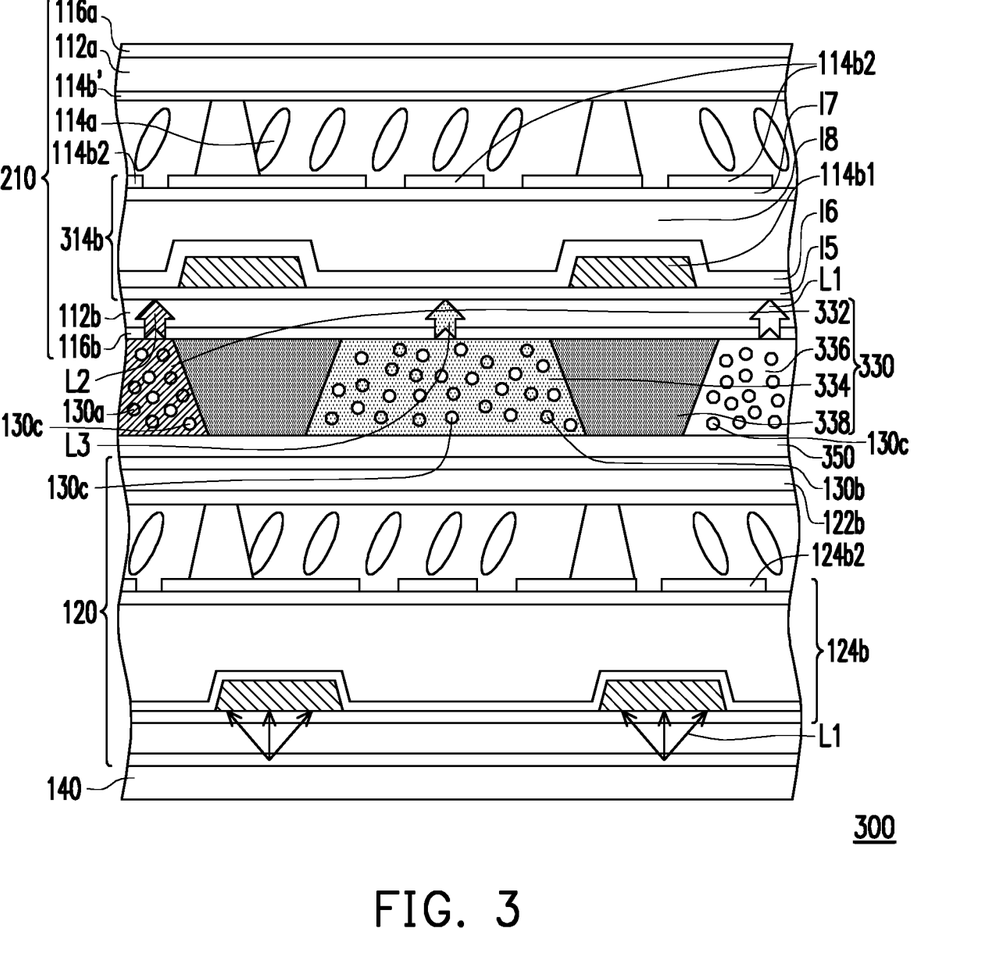
FIG. 3 is a schematic diagram of a display device according to an embodiment of the disclosure.

FIG. 3 is a schematic diagram of a display device according to another embodiment of the disclosure. Referring to FIG. 3, the display device 300 is substantially similar to the display device 100. Therefore, the same and similar element signs in the two embodiments represent the same and similar components, and disposing manners, structures, characteristics, materials and the like of these same and similar components may refer to related descriptions about the display device 100. Specifically, the display device 300 includes a first display panel 310, a second display panel 120, a quantum dot layer 330 and a backlight module 140. However, structural designs of the first display panel 310 and the quantum dot layer 330 of the present embodiment are different from the designs of the corresponding components of the display device 100.

In the present embodiment, the first display panel 310 includes a first substrate 112a, a second substrate 112b, a first display medium layer 114a, a first pixel array layer 314b, a counter electrode 114b', a first polarization layer 116a and a second polarization layer 116b. The first substrate 112a, the second substrate 112b, the first display medium layer 114a, the counter electrode 114b', the first polarization layer 116a and the second polarization layer 116b are substantially the same as the corresponding components in the display device 100. Here, the first display panel 310 includes no color filter layer. In addition, the structural design of the first pixel array layer 314b is different from that in the aforementioned embodiments mainly as follows: the first pixel array layer 314b includes multiple signal lines 114b1 (for example, scan lines and data lines), multiple active elements (not shown), multiple first pixel electrodes 114b2 and insulating layers I5, I6, I7 and I8 for spacing different conductive components, etc., the insulating layer I5 is located between the signal lines 114b1 and the second substrate 112b, the insulating layer I6 covers the signal lines 114b1, the insulating layer I7 is located between the first pixel electrodes 114b2 and the signal lines 114b1, and the insulating layer I8 is located between the insulating layer I6 and the insulating layer I7. In other embodiments, the quantity of the insulating layers may be regulated according to different requirements and is not limited thereto. The insulating layer I8 may be thick enough to provide a planarization function. All the insulating layers I5, I6, I7 and I8 have the characteristics of transmitting light and not changing the light color.

In addition, in the present embodiment, the quantum dot layer 330 includes multiple first quantum dot pixels 332, multiple second quantum dot pixels 334, multiple third quantum dot pixels 336 and spacing members 338, and the first pixel array layer 314b includes the multiple first pixel electrodes 114b2. Each of the first quantum dot pixels 332, the second quantum dot pixels 334 and the third quantum dot pixels 336 corresponds to one of these first pixel electrodes 114b2. That is, the first pixel electrodes 114b2 in the first display panel 310 correspond to the quantum dot pixels in the quantum dot layer 330 one to one. In part of embodiments, a pixel disposing density of a second pixel array layer 124b may be the same as a pixel disposing density of the first pixel array layer 314b. Therefore, second pixel electrodes 124b2 in the second pixel array layer 124b may also correspond to the quantum dot pixels in the quantum dot layer 330 one to one. In addition, the spacing members 338 are disposed between every adjacent two of the first quantum dot pixels 332, the second quantum dot pixels 334 and the third quantum dot pixels 336, to space different quantum dot pixels. The spacing members 338 may be made from, but not limited to, a black photoresist.

Specifically, like the quantum dot layer 130 in the aforementioned embodiments, the quantum dot layer 330 has multiple first quantum dot particles 130a, multiple second quantum dot particles 130b and diffusing particles 130c to provide functions of wavelength conversion, light refraction, light diffusion and the like. The first quantum dot pixels 332, the second quantum dot pixels 334 and the third quantum dot pixels 336 are quantum dot pixels with different optical properties. For example, all the first quantum dot particles 130a may be distributed in the first quantum dot pixels 332, all the second quantum dot particles 130b may be distributed in the second quantum dot pixels 334, and the diffusing particles 130c may be distributed in each of the first quantum dot pixels 332, the second quantum dot pixels 334 and the third quantum dot pixels 336. In part of embodiments, the first quantum dot pixel 332 may consist of a matrix material and multiple first quantum dot particles 130a and diffusing particles 130c distributed in the matrix material, the second quantum dot pixel 334 may consist of a matrix material and multiple second quantum dot particles 130b and diffusing particles 130c distributed in the matrix material, and the third quantum dot pixel 336 may consist of a matrix material and diffusing particles 130c. The matrix materials in the first quantum dot pixel 332, the second quantum dot pixel 334 and the third quantum dot pixel 336 may be, but not limited to, the same material, for example, an epoxy resin or acrylics.

A method for making the quantum dot layer 330 includes the following steps. After the non-attached second polarization layer 116b is made on the second substrate 112b, the spacing members 338 are made on the second polarization layer 116b, the spacing members 338 defining multiple grooves. Then, the matrix material mixed with the first quantum dot particles 130a is injected into a part of the grooves, the matrix material mixed with the second quantum dot particles 130b is injected into another part of the grooves, and the matrix mixed with the quantum dot particles is injected into a third part of the grooves. After the materials in the grooves are cured, the first quantum dot pixels 332, the second quantum dot pixels 334 and the third quantum dot pixels are formed in these grooves respectively. In addition, a protective layer 350 may further be formed on the quantum dot layer 330, to protect the quantum dot layer 330. A making manner for the non-attached second polarization layer 116b is selected from at least one of manners of deposition, coating, printing and the like, for example. That is, the second polarization layer 116b is not a component that is attached to the second substrate 112b after being premade but a component directly made on the second substrate 112b.

In the present embodiment, initial light L1 from the backlight module 140, after passing through the first quantum dot pixels 332, may be converted into first converted light L2 with a first wavelength range, the initial light L1 from the backlight module 140, after passing through the second quantum dot pixels 334, may be converted into second converted light L3 with a second wavelength range, and the initial light L1, after passing through the third quantum dot pixels 336, is still the initial light L1 with an original wavelength range (for example, a third wavelength range). The first wavelength range, the second wavelength range and the third wavelength range may be a red light range, a green light range and a blue light range respectively. Therefore, the quantum dot layer 330 may be used as a color filter layer to endow the display device 300 with a color display effect. In other words, the quantum dot layer 330 of the present embodiment may be understood as a quantum dot color filter layer. Therefore, the first display panel 310 of the display device 300 may include no color filter layer. However, in other embodiments, in a structure where the quantum dot layer 330 is disposed between the first display panel and the second display panel, the first display panel may optionally further include a color filter layer (for example, 118 in FIG. 1 or 218 in FIG. 2).

Figure 4:
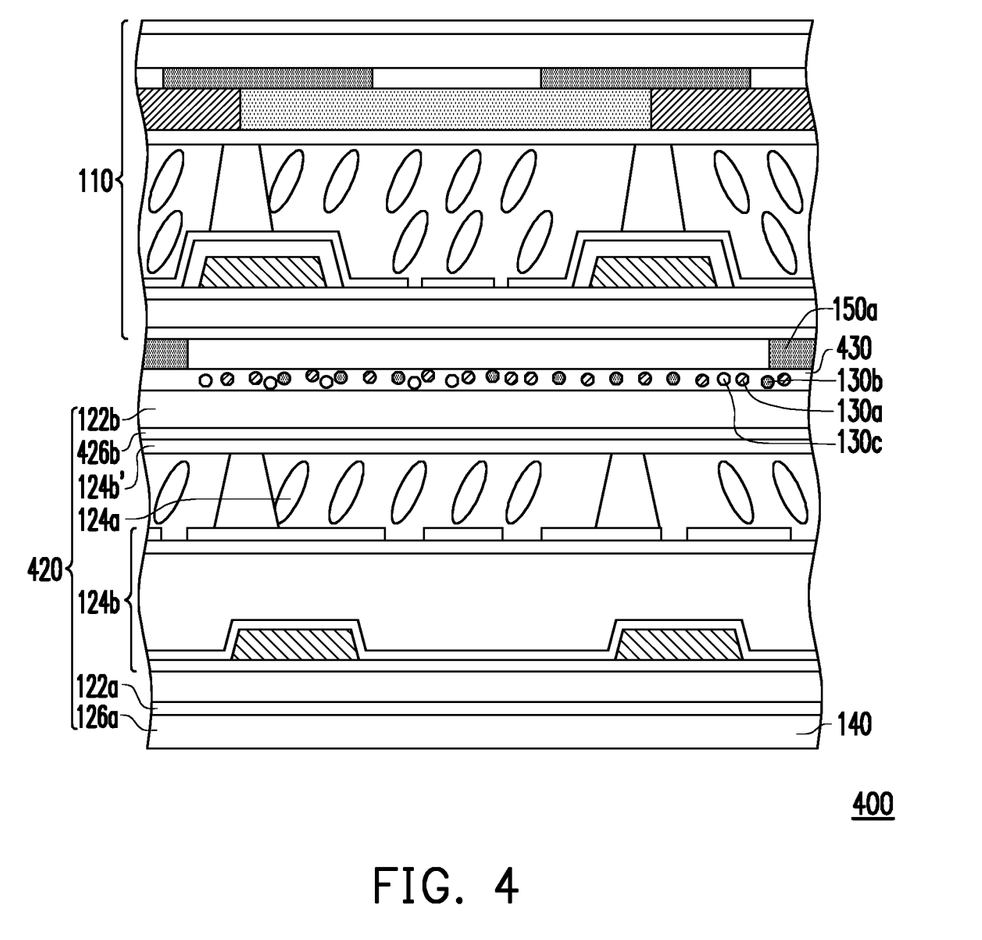
FIG. 4 is a schematic diagram of a display device according to an embodiment of the disclosure.

FIG. 4 is a schematic diagram of a display device according to another embodiment of the disclosure. The display device 400 is substantially similar to the display device 100. Therefore, the same and similar element signs in the two embodiments represent the same and similar components, and disposing manners, structures, characteristics, materials and the like of these same and similar components may refer to related descriptions about the display device 100. Specifically, the display device 400 includes a first display panel 110, a second display panel 420, a quantum dot layer 430, a backlight module 140 and a first adhesive layer 150a. However, structural designs of the second display panel 420 and the quantum dot layer 430 of the present embodiment are different from the designs of the corresponding components of the display device 100.

In the present embodiment, the second display panel 420 includes a third substrate 122a, a fourth substrate 122b, a second display medium layer 124a disposed between the third substrate 122a and the fourth substrate 122b, a second pixel array layer 124b, a counter electrode 124b', a third polarization layer 126a and a fourth polarization layer 426b. Functions and disposing relationship of the third substrate 122a, the fourth substrate 122b, the second display medium layer 124a, the second pixel array layer 124b, the counter electrode 124b' and the third polarization layer 126a are substantially similar to those of the aforementioned second display panel 120 and thus the descriptions thereof are omitted.

In the present embodiment, the quantum dot layer 430 contacts with the fourth substrate 122b, and includes multiple first quantum dot particles 130a, multiple second quantum dot particles 130b and diffusing particles 130c to provide functions of wavelength conversion, light refraction, light diffusion and the like. In part of embodiments, the quantum dot layer 430 may be formed on a surface of the fourth substrate 122b in a slit coating or another coating manner. Therefore, the quantum dot layer 430 may be fixed on the fourth substrate 122b without any other adhesive material. In addition, the fourth polarization layer 426b is disposed between the fourth substrate 122b and the second display medium layer 124a, and the fourth substrate 122b is disposed between the fourth polarization layer 426b and the quantum dot layer 430. The fourth polarization layer 426b may be a non-attached polarization layer. A making manner for the non-attached fourth polarization layer 426b is selected from at least one of manners of deposition, coating, printing and the like, for example. That is, the fourth polarization layer 426b is not a component that is attached to the fourth substrate 122b after being premade but a component directly made on the fourth substrate 122b. In the present embodiment, the fourth polarization layer 426b is made at the side, close to the second display medium layer 124a, of the fourth substrate 122b, the quantum dot layer 430 is made at the side, far away from the second display medium layer 124a, of the fourth substrate 122b, and the counter electrode 124b' may be disposed between the fourth polarization layer 426b and the second display medium layer 124a. Since the quantum dot layer 430, the fourth substrate 122b, the fourth polarization layer 426b and the counter electrode 124b' are bonded to one another without adhesion, the first display panel 110 and the second display panel 420 may be adhered to each other only through the first adhesive layer 150a, and the second adhesive layer 150b in the aforementioned embodiments is omitted.

Figure 5:
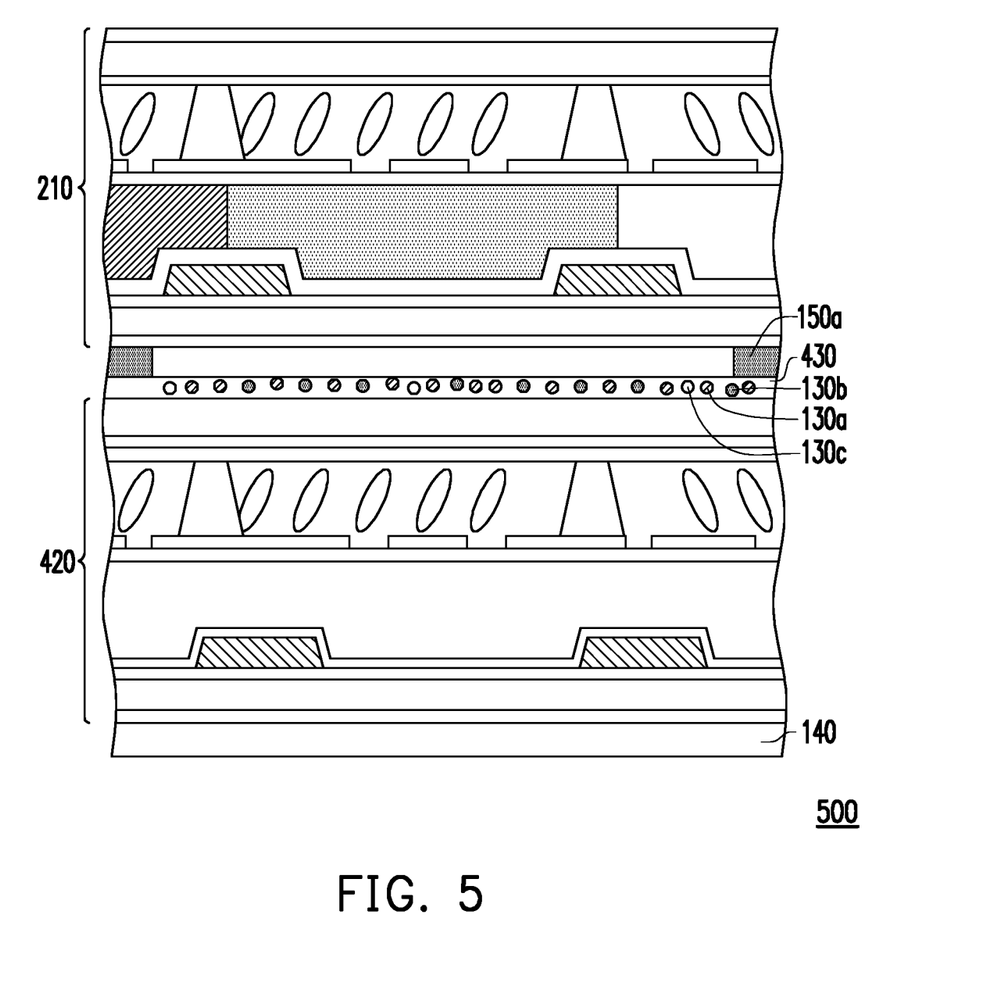
FIG. 5 is a schematic diagram of a display device according to an embodiment of the disclosure.

FIG. 5 is a schematic diagram of a display device according to another embodiment of the disclosure. Referring to FIG. 5, the display device 500 implements integrated application of the components in the aforementioned embodiments. The display device 500 includes a first display panel 210, a second display panel 420, a quantum dot layer 430 and a first adhesive layer 150a. The display device 500 is substantially similar to the display device 400, but the first display panel 210 in the display device 500 is substantially similar to the first display panel 210 in FIG. 2. Therefore, these similar components are marked with the same or similar signs and the descriptions thereof are omitted. Specific structures and arrangement of the first display panel 210, the second display panel 420 and the quantum dot layer 430 may refer to the foregoing descriptions.

Figure 6:
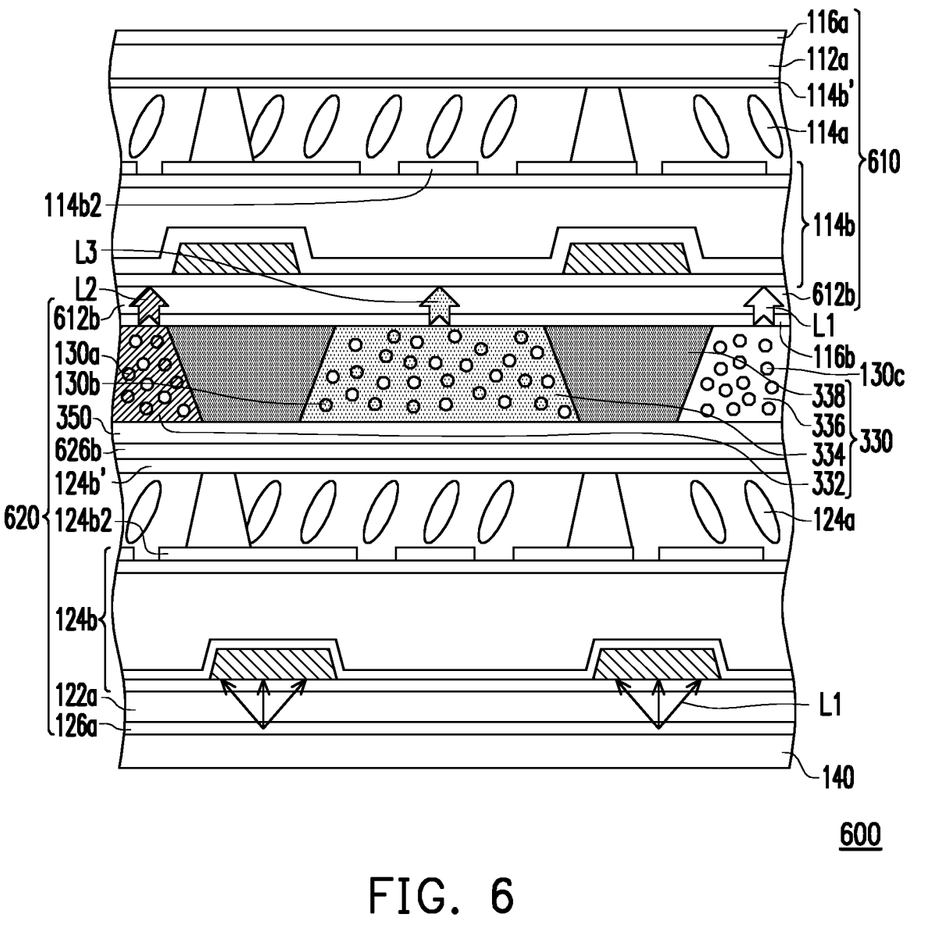
FIG. 6 is a schematic diagram of a display device according to an embodiment of the disclosure.

FIG. 6 is a schematic diagram of a display device according to another embodiment of the disclosure. Referring to FIG. 6, the display device 600 is substantially similar to the display device 300, but the fourth substrate 122b in the display device 300 is omitted. Therefore, the display device 600 of the present embodiment has such a structure that two display panels share a substrate. Specifically, the display device 600 includes a first display panel 610, a second display panel 620 and a quantum dot layer 330, and the first display panel 610 and the second display panel 620 share a second substrate 612b. In addition, the quantum dot layer 330 is disposed on the second substrate 612b and located in the second display panel 620. However, the quantum dot layer is not limited thereto.

Specifically, the first display panel 610, like the first display panel 310, includes a first substrate 112a, the second substrate 612*b*, a first display medium layer 114*a* disposed between the first substrate 112*a* and the second substrate 612*b*, a first pixel array layer 114*b*, a counter electrode 114*b'*, a first polarization layer 116*a* and a second polarization layer 116*b*. The first substrate 112*a*, the second substrate 612*b*, the first display medium layer 114*a*, the counter electrode 114*b'*, the first polarization layer 116*a* and the second polarization layer 116*b* are substantially the same as the corresponding components in the display device 100. Here, the first display panel 610 includes no color filter layer.

The second display panel 620 includes the second substrate 612*b* (shared with the first display panel 610), a third substrate 122*a*, a second display medium layer 124*a* disposed between the third substrate 122*a* and the second substrate 612*b*, a second pixel array layer 124*b*, a counter electrode 124*b'*, a third polarization layer 126*a* and a fourth polarization layer 626*b*. In the present embodiment, since the first display panel 610 and the second display panel 620 share the second substrate 612*b*, the second substrate 612*b* is located between the first substrate 112*a* and the third substrate 122*a*. Therefore, there is no substrate disposed between the second polarization layer 116*b* and the fourth polarization layer 626*b*. In addition, the quantum dot layer 330 is located between the second polarization layer 116*b* and the fourth polarization layer 626*b*.

The quantum dot layer 330 is located between the first display medium layer 114*a* and the second display medium layer 124*a*, and the quantum dot layer 330 includes multiple first quantum dot pixels 332, multiple second quantum dot pixels 334, multiple third quantum dot pixels 336 and spacing members 338. In addition, a protective layer 350 may be disposed at the side, close to the second display medium layer 124*a*, of the quantum dot layer 330. Specific structures and making manners of the quantum dot layer 330 and the protective layer 350 may refer to the related descriptions in the embodiment shown in FIG. 3. That is, multiple first quantum dot particles 130*a* and diffusing particles 130*c* may be distributed in the first quantum dot pixels 332, multiple second quantum dot particles 130*b* and diffusing particles 130*c* may be distributed in the second quantum dot pixels 334, and there may substantially be no quantum dot particles but diffusing particles 130*c* distributed in the third quantum dot pixels 336.

In the present embodiment, initial light L1 from a backlight module 140, after passing through the first quantum dot pixels 332, may be converted into first converted light L2 with a first wavelength range, the initial light L1 from the backlight module 140, after passing through the second quantum dot pixels 334, may be converted into second converted light L3 with a second wavelength range, and the initial light L1, after passing through the third quantum dot pixels 336, is still the initial light L1 with an original wavelength range (for example, a third wavelength range). The first wavelength range, the second wavelength range and the third wavelength range may be a red light range, a green light range and a blue light range respectively. Therefore, the quantum dot layer 330 may be used as a color filter layer to endow the display device 300 with a color display effect.

In addition, the first pixel array layer 114*b* includes multiple first pixel electrodes 114*b*2 arranged in an array, the second pixel array layer 124*b* includes multiple second pixel electrodes 124*b*2 arranged in an array, and each of the first quantum dot pixels 332, the second quantum dot pixels 334 and the third quantum dot pixels 336 corresponds to one of the first pixel electrodes 114*b*2 and also corresponds to one of the second pixel electrodes 124*b*2. However, in other embodiments, a disposing density of the second pixel electrodes 124*b*2 may be different from a disposing density of the first pixel electrodes 114*b*2. Therefore, in part of embodiments, each of the first quantum dot pixels 332, the second quantum dot pixels 334 and the third quantum dot pixels 336 corresponds to one of the first pixel electrodes 114*b*2, but multiple second pixel electrodes 124*b*2 correspond to one of the first quantum dot pixels 332, the second quantum dot pixels 334 and the third quantum dot pixels 336.

In the present embodiment, both the second polarization layer 116*b* and the fourth polarization layer 626*b* may be non-attached polarization layers, but the second polarization layer 116*b*, the quantum dot layer 330, the protective layer 350 and the fourth polarization layer 626*b* may be sequentially made on the second substrate 612*b*. No substrate but the quantum dot layer 330 and the protective layer 350 thereof are disposed between the second polarization layer 116*b* and the fourth polarization layer 626*b*. Therefore, no adhesive layer may be disposed between the first display panel 610 and the second display panel 620 sharing the second substrate 612*b*, which is favorable for thinning the whole display device 600. Based on the above, according to the disclosure, the quantum dot layer is disposed between the first display panel and the second display panel to improve moiré patterns formed by an interference phenomenon caused by the first pixel array layer and the second pixel array layer, improve the display effect of the display device and achieve relatively high display quality.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A display device, comprising:
    a first display panel, comprising a first substrate, a second substrate and a first display medium layer disposed between the second substrate and the first substrate;
    a second display panel, comprising a third substrate, a fourth substrate and a second display medium layer disposed between the third substrate and the fourth substrate, the first display panel and the second display panel being mutually stacked in a manner that the second substrate and the fourth substrate are located between the first substrate and the third substrate;
    a quantum dot layer, disposed between the second substrate and the fourth substrate, the quantum dot layer comprising multiple first quantum dot particles, multiple second quantum dot particles and multiple diffusing particles dispersed therein; and
    a backlight module, located at a side of the second display panel away from the first display panel, wherein a light emitted by the backlight module passes through the second display panel and then the quantum dot layer for incidence to the first display panel.

2. The display device according to claim 1, wherein the first display panel further comprises a first polarization layer and a second polarization layer, the second display panel further comprises a third polarization layer and a fourth polarization layer, the first display medium layer is located between the first polarization layer and the second polarization layer, the second display medium layer is located between the third polarization layer and the fourth polarization layer, the quantum dot layer is located between the second polarization layer and the fourth polarization layer, and both the first display panel and the second display panel are located between the first polarization layer and the third polarization layer.

3. The display device according to claim 2, wherein the second polarization layer is disposed between the second substrate and the quantum dot layer.

4. The display device according to claim 2, wherein the fourth polarization layer is disposed between the fourth substrate and the quantum dot layer.

5. The display device according to claim 2, wherein the fourth polarization layer is disposed between the fourth substrate and the second display medium layer.

6. The display device according to claim 5, wherein the fourth substrate is disposed between the fourth polarization layer and the quantum dot layer, and the quantum dot layer contacts with the fourth substrate.

7. The display device according to claim 1, further comprising a first adhesive layer that adheres the quantum dot layer to one of the first display panel and the second display panel.

8. The display device according to claim 7, further comprising a second adhesive layer that adheres the quantum dot layer to the other of the first display panel and the second display panel.

9. The display device according to claim 1, wherein the backlight module is used for emitting initial light towards the second display panel, the initial light is converted to have a first wavelength range after passing through the first quantum dot particles and is converted to have a second wavelength range after passing through the second quantum dot particles, the initial light has a third wavelength range, and a third part of the initial light still has the third wavelength range after passing through the diffusing particles, the first wavelength range, the second wavelength range and the third wavelength range being different from one another.

10. The display device according to claim 1, wherein the first display panel further comprises a first pixel array layer disposed between the second substrate and the first display medium layer, and the second display panel further comprises a second pixel array layer disposed between the third substrate and the second display medium layer.

11. The display device according to claim 10, wherein a first pixel disposing density of the first pixel array layer is different from a second pixel disposing density of the second pixel array layer.

12. The display device according to claim 10, wherein the quantum dot layer comprises multiple first quantum dot pixels, multiple second quantum dot pixels and multiple third quantum dot pixels, the first pixel array layer comprises multiple first pixel electrodes, and each of the first quantum dot pixels, the second quantum dot pixels and the third quantum dot pixels corresponds to one of the first pixel electrodes.

13. The display device according to claim 12, wherein all the first quantum dot particles are distributed in the first quantum dot pixels, all the second quantum dot particles are distributed in the second quantum dot pixels, and the diffusing particles are distributed in the first quantum dot pixels, the second quantum dot pixels and the third quantum dot pixels.

14. The display device according to claim 12, wherein the quantum dot layer further comprises multiple spacing members, and the spacing members are disposed between every adjacent two of the first quantum dot pixels, the second quantum dot pixels and the third quantum dot pixels respectively.

15. The display device according to claim 1, wherein the first display panel further comprises a color filter layer, and the color filter layer is disposed between the first substrate and the first display medium layer or disposed between the second substrate and the first display medium layer.

16. A display device, comprising:
a first substrate;
a second substrate, opposite to the first substrate;
a first display medium layer, disposed between the first substrate and the second substrate;
a third substrate, the second substrate being located between the first substrate and the third substrate;
a second display medium layer, disposed between the second substrate and the third substrate;
a quantum dot layer, located between the first display medium layer and the second display medium layer, the quantum dot layer comprising multiple first quantum dot pixels, multiple second quantum dot pixels and multiple third quantum dot pixels, each of the first quantum dot pixels comprising multiple first quantum dot particles, each of the second quantum dot pixels comprising multiple second quantum dot particles, and each of the first quantum dot pixels, the second quantum dot pixels and the third quantum dot pixels comprising multiple diffusing particles;
a fourth substrate, the fourth substrate being located between the second display medium layer and the quantum dot layer; and
a backlight module, disposed at a side of the third substrate away from the second display medium layer, wherein a light emitted by the backlight module passes through the second display medium layer and then the quantum dot layer for incidence to the first display medium layer.

17. The display device according to claim 16, further comprising a first pixel array layer, wherein the first pixel array layer is disposed between the second substrate and the first display medium layer, the first pixel array layer comprises multiple first pixel electrodes, and each of the first quantum dot pixels, the second quantum dot pixels and the third quantum dot pixels corresponds to one of the first pixel electrodes.

18. The display device according to claim 17, further comprising a second pixel array layer, wherein the second pixel array layer is disposed between the third substrate and the second display medium layer, the second pixel array layer comprises multiple second pixel electrodes, and each of the first quantum dot pixels, the second quantum dot pixels and the third quantum dot pixels corresponds to one of the second pixel electrodes.

19. The display device according to claim 16, wherein the quantum dot layer further comprises multiple spacing members, and the spacing members are disposed between every adjacent two of the first quantum dot pixels, the second quantum dot pixels and the third quantum dot pixels respectively.

* * * * *